United States Patent
Wann

[19]

[11] Patent Number: 6,057,724
[45] Date of Patent: May 2, 2000

[54] METHOD AND APPARATUS FOR SYNCHRONIZED CLOCK DISTRIBUTION

[75] Inventor: Hsing-Jen Wann, Briarcliff Manor, N.Y.

[73] Assignee: International Business Machines Corp., Armonk, N.Y.

[21] Appl. No.: 09/114,732

[22] Filed: Jul. 13, 1998

[51] Int. Cl.[7] .................................................. H03K 1/04
[52] U.S. Cl. ........................................ 327/292; 329/565
[58] Field of Search .................................. 327/295, 297, 327/291, 564, 565, 566, 293

[56] References Cited

U.S. PATENT DOCUMENTS

| | | | |
|---|---|---|---|
| 4,958,092 | 9/1990 | Tanaka | 327/297 |
| 5,164,817 | 11/1992 | Eisenstadt et al. | 327/297 |
| 5,296,748 | 3/1994 | Wicklund et al. | 327/565 |
| 5,517,532 | 5/1996 | Reymond | 327/141 |
| 5,519,351 | 5/1996 | Matsumoto | 327/295 |
| 5,640,112 | 6/1997 | Goto et al. | 375/354 |
| 5,691,662 | 11/1997 | Soboleski et al. | 327/292 |

OTHER PUBLICATIONS

Circuits, Interconnections and Packaging for VLSI, by H.B. Bakuglu, Chapter 1, System–Level Performance Optimization, pp. 14 and 15.

*Primary Examiner*—Toan Tran
*Attorney, Agent, or Firm*—Fleit, Kain, Gibbons, Gutman & Bongini P.L.

[57] ABSTRACT

A method and apparatus are described which eliminate the clock skew problems associated with routing clock signals throughout a circuit. Particularly well suited for Very Large Scale Integration ("VLSI") chips, the method and apparatus provide a resonator which is distributed across the circuit. This allows the clock to be accessed at a variety of locations without any propagation delay between the access points. The method for distributing a single, distributed clock signal to a plurality of clock connection points in a circuit comprises two steps. The first step is to generate the clock signal, such that the clock signal is available at a plurality of clock source points without propagation delay. The second step is to couple the plurality of clock source points to the plurality of clock connection points in the circuit.

9 Claims, 4 Drawing Sheets

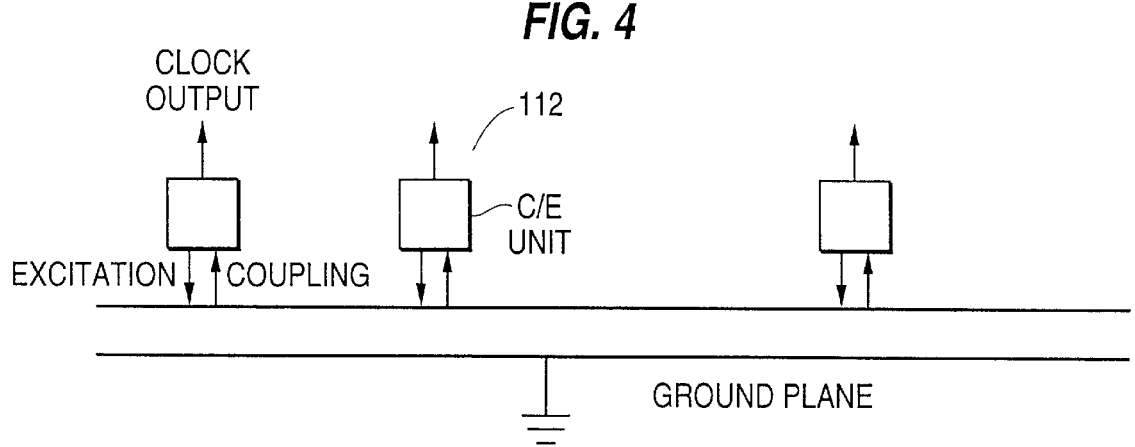
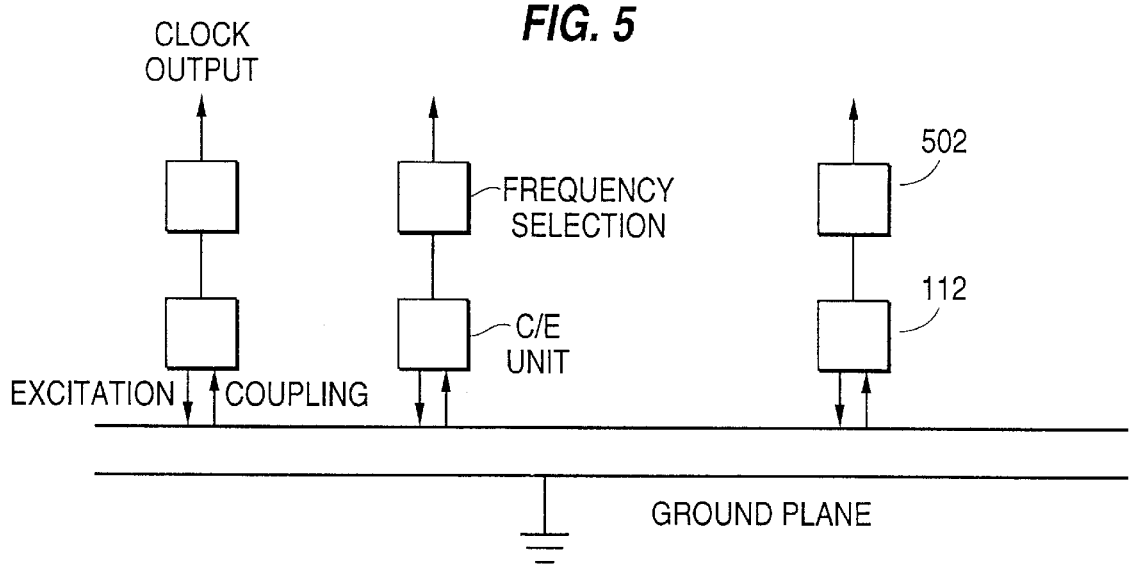

METHOD AND APPARATUS FOR SYNCHRONIZED CLOCK DISTRIBUTION

CROSS-REFERENCE TO RELATED APPLICATIONS

Not applicable.

BACKGROUND OF THE INVENTION

1. Field of the Invention

The invention disclosed broadly relates to the distribution of clock signals in circuits, and more particularly relates to synchronizing the clock signal in Very Large Scale Integration ("VLSI") circuits.

2. Description of the Related Art

Clock signals are usually responsible for coordinating the various operations performed in a circuit. Serious problems can result if the clock signals received by different parts of the circuit are not synchronized. A lack of synchronization can occur because because the different parts of the circuit are at different distances from the clock source. This causes the received clock signals to have different propagation delays and to be out of phase with each other. This problem, known as clock skew, can occur at the system level, the board level, and the chip level, and it becomes more severe as the circuit size increases and as the clock speed increases. At the chip level, trends in VLSI design are exacerbating the problem by moving toward larger chips and higher clock speeds.

Several approaches have been developed to reduce the phase mismatch due to propagation delay. A typical conventional clock distribution network, for example, uses a symmetric H-tree or other symmetric configuration to minimize the clock skew between different locations on a chip. A discussion of such a clock distribution network can be found, for example, in the book *Circuits, Interconnections, and Packaging for VLSI*, by H. B. Bakuglu.

Another solution for reducing the phase mismatch is to increase the speed at which the clock signals propagate through the circuit, and thus to decrease the propagation delay. To this end, thick, metal wires with reduced capacitance and resistance have been employed. However, the speed of distributing a clock signal is limited by the speed of light in the medium. This, in turn, dictates the minimum time required to propagate through the medium, or the time-of-flight. These limitations limit the potential benefits of this solution.

As an example, assume that the propagation speed of a guided wave in a particular medium is half of the speed of light in a vacuum, or $1.5 \times 10^{10}$ cm/sec. Also assume, as is common with modem chips, that the size of the chip is 3 cm. The time required for the wave to propagate 3 cm is 200 ps (a picosecond is $1 \times 10^{-12}$ seconds). Further assuming that the chip is to be designed with a skew of no more than 10% of a cycle, then the clock period must be at least 2000 ps, and the clock frequency can be no more than 500 MHZ. In equation form, the frequency is thus equal to speed of light in the medium, multiplied by the allowable skew expressed as a fraction of the period, and divided by the distance traveled:

$$f = \text{speed} * (\text{allowable skew fraction})/\text{distance}.$$

It follows then, that for a given chip size and allowable skew, there is an upper limit on the attainable clock frequency because there is an upper limit on the speed with which a wave can propagate through a medium.

A third solution is to use several sub-clocks. The chip may be divided into several regions, and a separate clock can serve each region. This reduces the distance that a clock signal must travel, and allows shorter leads and lower propagation delays. In the example above, providing a different clock for each quadrant of the circuit would reduce the maximum distance by a factor of two. This would allow a maximum clock frequency of 1 GHz. This solution can, theoretically, always allow a higher clock by further subdividing the chip so that the propagation delay is further reduced. In practice, however, this solution creates problems of synchronizing the various clocks. Additionally, each additional clock takes up valuable space on the chip.

Yet another solution is to use a standing wave, such that the phase is substantially the same at all points in the circuit. Two such solutions are described in U.S. Pat. Nos. 5,517,532 and 5,640,112. Both patents require an external clock generator, and also suggest limiting the length of the clock distribution system to either $\frac{1}{8}$ or $\frac{1}{16}$ of the wavelength of the clock frequency. U.S. Pat. No. 5,640,112 also introduces a phase advancing means, such as an RC circuit with an amplifier, that can be used to synchronize the phase in various branches of the clock distribution system. This offers a solution to the limited length, but at the cost of designing and adding the phase advancing components.

Accordingly, there is a need for a method and apparatus for distributing clock signals which overcome these problems.

SUMMARY OF THE INVENTION

Briefly, according to the present invention, a method for distributing a single, distributed clock signal to a plurality of clock connection points in a circuit comprises two steps. The first is generating the clock signal, such that the clock signal is available at a plurality of clock source points without propagation delay. The second is coupling the plurality of clock source points to the plurality of clock connection points in the circuit.

Briefly, according to another aspect of the invention, an apparatus is provided which implements the above method.

BRIEF DESCRIPTION OF THE DRAWINGS

FIG. 4 shows a block diagram of an embodiment in which the clock signal is accessed from the exterior surface of the resonator.

FIG. 5 shows the block diagram of FIG. 4 with the addition of frequency selection units.

DETAILED DESCRIPTION OF AN EMBODIMENT

According to the present invention, there is provided a distributed clock generator, such as a resonator. No external clock generator is required. Furthermore, the invention does not operate by producing and transmitting a standing wave, so the prior art's restrictions of the system length to $\frac{1}{8}$ or $\frac{1}{16}$ of the wavelength are not applicable. The clock signal that is produced is available in a plurality of locations, simultaneously, without clock skew due to clock signal propagation.

Figure 1:
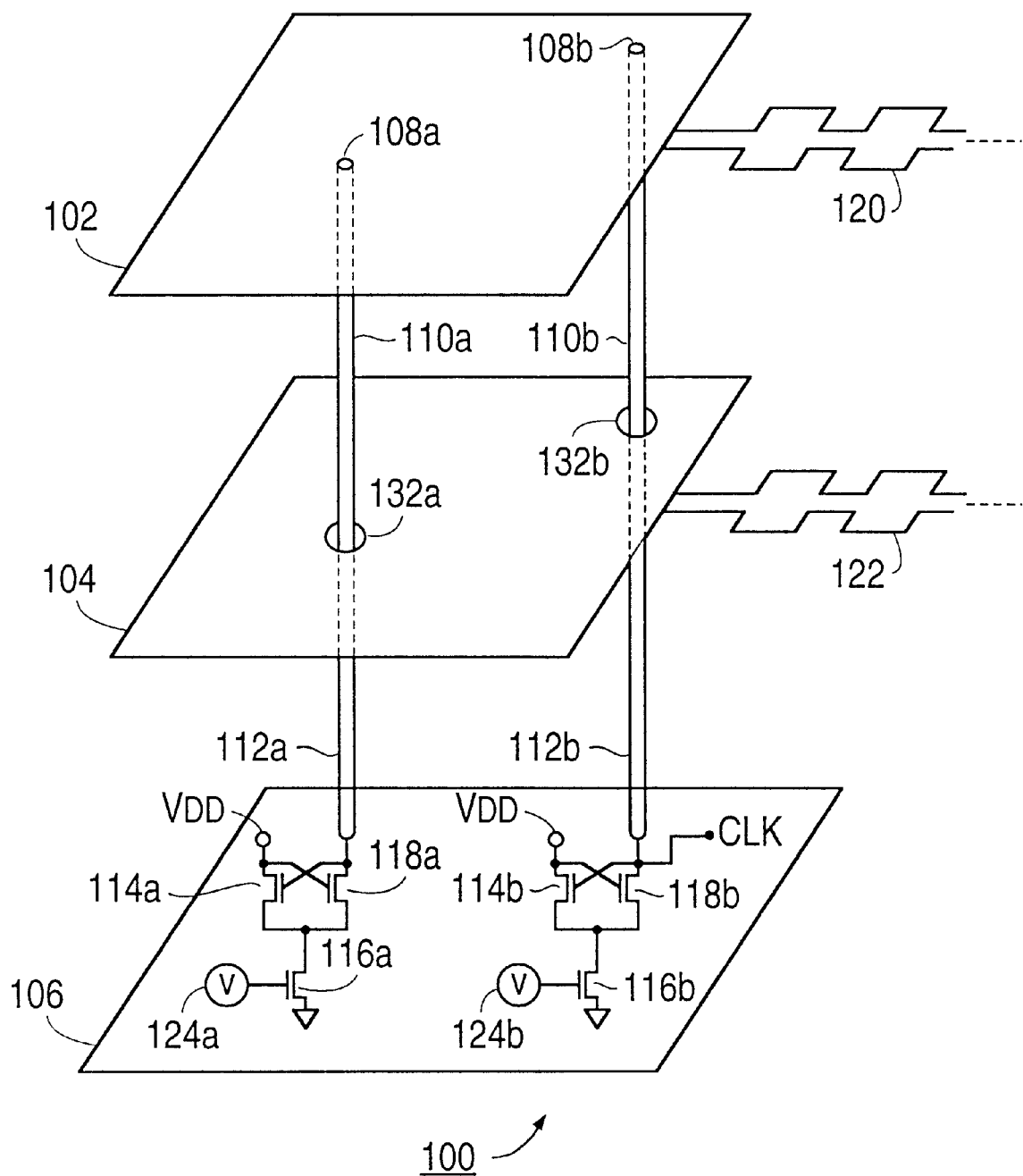
FIG. 1 shows an integrated circuit ("IC") containing a parallel plate resonator fi)r distributing a synchronized clock according to the present invention.
Figure 3:
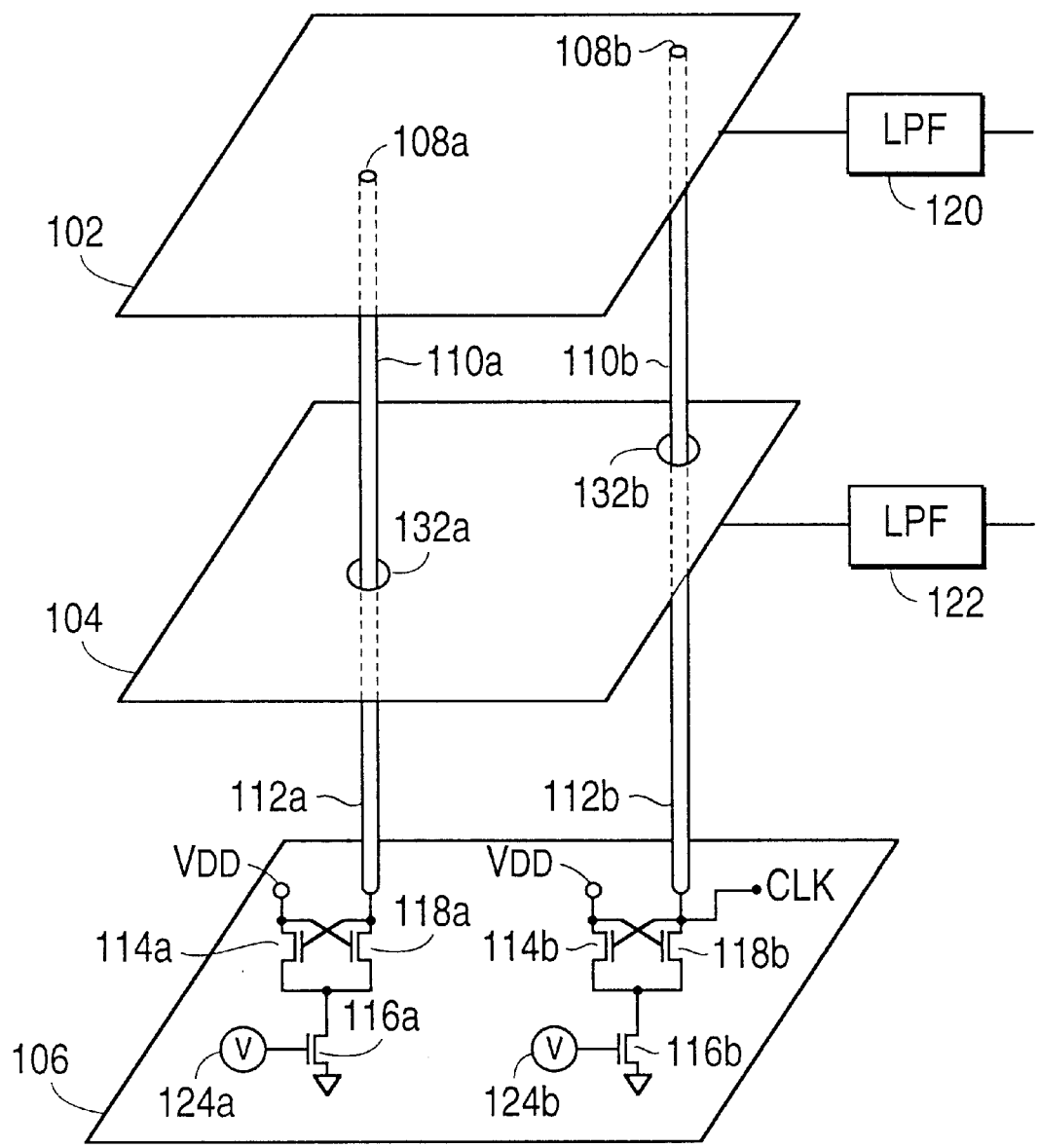
FIG. 3 shows the IC of FIG. 1 with generic low-pass filters attached to the plates of the resonator.

Referring to FIG. 1, the preferred embodiment 100 shows a parallel plate microstrip patch resonator. The resonant cavity is established between an upper plate 102 and a lower plate 104, which are preferably made of aluminum or copper. The upper plate 102 is shown connected to a low-pass filter 120. This filter 120 is used to isolate the clock signal from the direct current ("DC") power supply. A similar filter 122 is shown connected to the lower plate 104. The low-pass filters 120, 122 of FIG. 1 are made of metal, preferably either aluminum or copper, and their frequency characteristic is determined by their shape. Alternate embodiments may implement the low-pass filters 120, 122 differently, as indicated in FIG. 3.

The clock signal generated by the resonator can be accessed at any point on the interior surface of the cavity. Two access points 108a, 108b are shown, each of which is connected to a coupling device 112a, 112b. The clock signal is carried along a conductor 110a, 110b through vias 132a, 132b in the lower plate 104. These vias 132a, 132b are small enough so that they do not disturb the operation of the parallel plate microstrip patch resonator. The conductors 110a, 110b carry the clock signal to the circuits 112a, 112b which are located in the circuit layer 106. In an alternate implementation, other coupling devices, including but not limited to antennas or magnetic couplers, could be used. If the circuit comprises multiple layers, then, in the process of fabrication, the conductors 110 can be created as a stack of small copper columns, wherein each layer contains one column segment, or portion, of the conductors 110. Additionally, the preferred embodiment can be fabricated using C4 flip chip technology.

As explained above, in the preferred embodiment the clock signal is accessed on an interior surface of the resonator. This is preferred because, for relatively high frequencies, the signal (or the field) is not accessible on the exterior surfaces. As the frequency is lowered, however, the penetration depth of the field increases, that is, the field penetrates the plates further. Therefore, if the frequency is low enough, or the plates are thin enough, the clock signals can also be accessed on the exterior of the resonator. FIGS. 4 and 5, which are high level block diagrams and will be further explained below, show such a configuration. Aside from this difference in where the clock signal is accessed, FIG. 4 essentially shows the configuration of FIG. 1.

By generating the clock signal with a parallel plate microstrip patch resonator, or any resonator more generally, the clock signal is actually produced between the resonating plates 102, 104. The clock is thereby available at any point on the interior of the plates 102, 104 without any phase difference. This means that the clock can be accessed at different points with no propagation delay, because the signal does not have to propagate between the two different points. Thus, the problem of clock skew in the prior art is significantly, and for some applications completely, reduced. The parallel plate resonator of FIG. 1 requires input energy to compensate the loss in order to sustain its oscillations. Cross-coupled latch circuits 112 provide this energy in the form of a small signal negative resistance. Each circuit 112a, 112b contains three transistors. Two of the transistors 114, 118 are cross-coupled, with their gates connected to the drain of the opposite transistor 118, 114. The drain of one of the transistors 118 is further connected to the resonator, and the drain of the other transistor 114 is further connected to a fixed voltage supply such as VDD. The sources of the two cross-coupled transistors 144, 118 are tied together. The third transistor 116 is used to control the gain, and it accomplishes this by controlling the amount of negative resistance that is supplied to the resonator. The drain of the transistor 116 is connected to the sources of the crosscoupled transistors 114, 118, and the source of the transistor 116 is connected to ground. The current flowing through the transistor 116, and the transistor 118, is controlled by the level of the voltage supply V 124, which is connected to the gate of the transistor 116.

In the preferred embodiment, it is possible to connect to the clock signal from any point in the circuit layer 106. As mentioned earlier, this eliminates the delays associated with routing the clock to various parts of the circuit (i.e. propagation delay). The propagation delay for the clock signal will then depend primarily on the coupling device used. The coupling devices can be designed to have a common delay length, or to have delay lengths that fall within a given specification.

Figure 2:
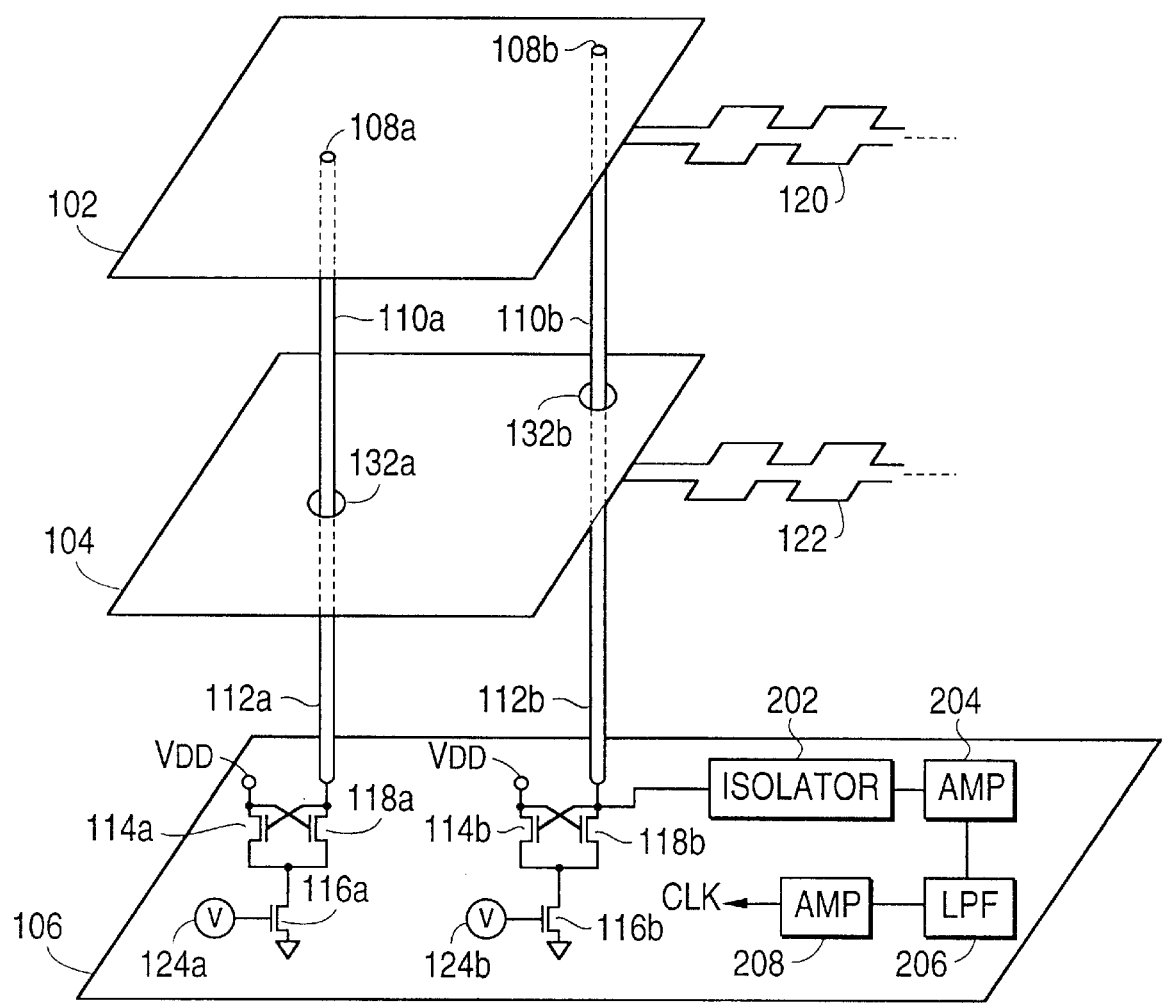
FIG. 2 shows the IC of FIG. 1 with additional processing of the clock signal.

Alternate embodiments may process the clock signal further before using it as a clock signal. FIG. 2 shows, for one of the cross-coupled circuits 112b, the addition of an isolator 202, a low-pass filter 206, and two associated amplifiers 204, 208. These devices serve two general purposes. The first is to isolate the resonator and the clock signal from the rest of the circuit, and this is accomplished with the isolator 202. The second is to filter any higher order frequencies from the outgoing clock signal before it is used as a clock signal. This second function is accomplished with the amplifiers 204, 208 and the low-pass filter 206. This low-pass filter needs to pass the desired clock frequency, and is therefore of a different design from the low-pass filters 120, 122 connected to the plates 102, 104 of the resonator. Those filters 120, 122 are designed to filter the clock frequency.

The size of the microstrip resonator is typically one half of the wavelength at tie operating frequency of the clock signal. For example, for a 2 GHz clock frequency, one half of a wavelength in free space is 7.5 cm. The wavelength in the chip environment, which is typically one half of that in free space, is roughly 3.75 cm. Clearly, as the frequency is increased, the wavelength, and therefore the resonator size, will decrease. The industry trend is moving in this direction. However, the industry is also moving towards larger chips, containing more functions. Thus, there is a tradeoff between increasing frequency and increasing chip size. The preferred frequency for balancing this tradeoff is between 2 and 3 GHz.

It is desirable, however, to increase the chip size beyond this. More functions, whether on the same integrated circuit ("IC") or on multiple ICs within the same chip package, can then be performed with a single chip. FIG. 5 shows an embodiment which is able to generate clock frequencies with a resonator that is smaller than one half of the clock wavelength. That embodiment uses frequency selection 502 to isolate a higher order frequency. Such a system is similar to that in FIG. 2, except that a band-pass filter ("BPF") would typically be used instead of the LPF 206. As an alternative to putting more functions in a single chip, known methods of synchronizing the clocks of separate chips could be used.

Certain applications may utilize more than one resonator. This may be done, for example, to provide different clock frequencies or to cover a larger chip size. This approach will also reduce, and for some applications eliminate, clock skew.

Although FIGS. 1 and 2 may show, and this section may describe, the various components as being connected to each other, it is usually only necessary that the components be coupled to each other. Coupling allows for the possibility that the components may have other devices disposed between them.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A system for distributing a single, distributed clock signal to a plurality of clock connection points in a circuit, the system comprising:
   a. means for generating the single, distributed clock signal, such that the clock signal is available at a plurality of clock source points without propagation delay; and
   b. means for coupling the plurality of clock source points to the plurality of clock connection points in the circuit.

2. The system of claim 1, wherein the means for coupling introduces a common delay between each of the coupled clock source points and clock connection points.

3. The system of claim 1, comprising:
   a. a plurality of means for generating a single, distributed clock signal, such that the system generates a plurality of different distributed clock signals, wherein, for each clock signal, the clock signal is available at a plurality of the clock source points without propagation delay between those clock source points; and
   b. a plurality of means for coupling the plurality of distributed clock signals to different points in the circuit, such that the plurality of clock source point associated with each clock signal can be connected to at least one clock connection point in the circuit.

4. The system of claim 3, wherein each of the distributed clock signals has a different frequency.

5. The system of claim 1, wherein:
   a. the means for generating the single, distributed clock signal comprises a parallel plate microstrip patch resonator; and
   b. the means for coupling comprises a plurality of cross-coupled latch circuits, each of which is coupled to one of the clock source points and I:) one of the clock connection points.

6. The system of claim 1, further comprising means for filtering the clock signal, wherein the means for filtering is disposed between the means for coupling and at least one of the plurality of clock connection points in the circuit.

7. The system of claim 6, wherein the means for filtering comprises:
   a. an isolator comprising a first port and a second port, disposed between the means for coupling and the clock connection point such that the first port of the isolator is coupled to both the clock source point and the cross-coupled latch circuit;
   b. a first amplifier comprising an input and an output, disposed between the isolator and the clock connection point such that the input of the first amplifier is coupled to the second port of the isolator;
   c. a low-pass filter comprising an input and an output, disposed between the first amplifier and the clock connection point such that the input of the low-pass filter is coupled to the output of the first amplifier; and
   d. a second amplifier comprising an input an output, disposed between the low-pass filter and the clock connection point such that the input of the second amplifier is coupled to the output of the low-pass filter, and the output of the second amplifier is coupled to the clock connection point.

8. A method for distributing a single, distributed clock signal to a plurality of clock connection points in a circuit, the method comprising the steps of:
   a. generating the single, distributed clock signal, such that the clock signal is available at a plurality of clock source points without propagation delay; and
   b. coupling the plurality of clock source points to the plurality of clock connection points in the circuit.

9. The method of claim 8, comprising the steps of:
   a. generating a plurality of distributed clock signals, such that each of the plurality of clock signals is available at a plurality of the clock source points without propagation delay; and
   b. coupling the plurality of distributed clock signals to different points in the circuit, such that the plurality of clock source points associated with each clock signal are each capable of being connected to at least one of the plurality of clock connection points in the circuit.

* * * * *